Oct. 6, 1931.  C. R. FLANIGAN  1,826,278

STEERING WHEEL

Filed Aug. 14, 1928

INVENTOR.

Charles R. Flanigan

BY

ATTORNEYS

Patented Oct. 6, 1931

1,826,278

UNITED STATES PATENT OFFICE

CHARLES R. FLANIGAN, OF CLEVELAND, OHIO, ASSIGNOR TO THE COLUMBIA AXLE COMPANY, OF CLEVELAND, OHIO, A CORPORATION OF OHIO

STEERING WHEEL

Application filed August 14, 1928. Serial No. 299,479.

The present invention relates, as indicated, to steering wheels, and more patricularly to a novel mounting for steering wheels of automotive vehicles. The primary object of the invention is to provide a structure whereby transmission of road shocks from the road wheels of an automobile to the steering wheel thereof will be prevented. The invention may be used to some advantage also in the steering mechanism of boats and airplanes to prevent the transmission to the steering wheel of shocks delivered to the rudder by waves of unevenness in air currents. A further object of the invention is to provide a steering wheel so constructed as to minimize the possibility of injury to an automobile driver in case of collision. Further objects of the invention will appear as the description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 2:
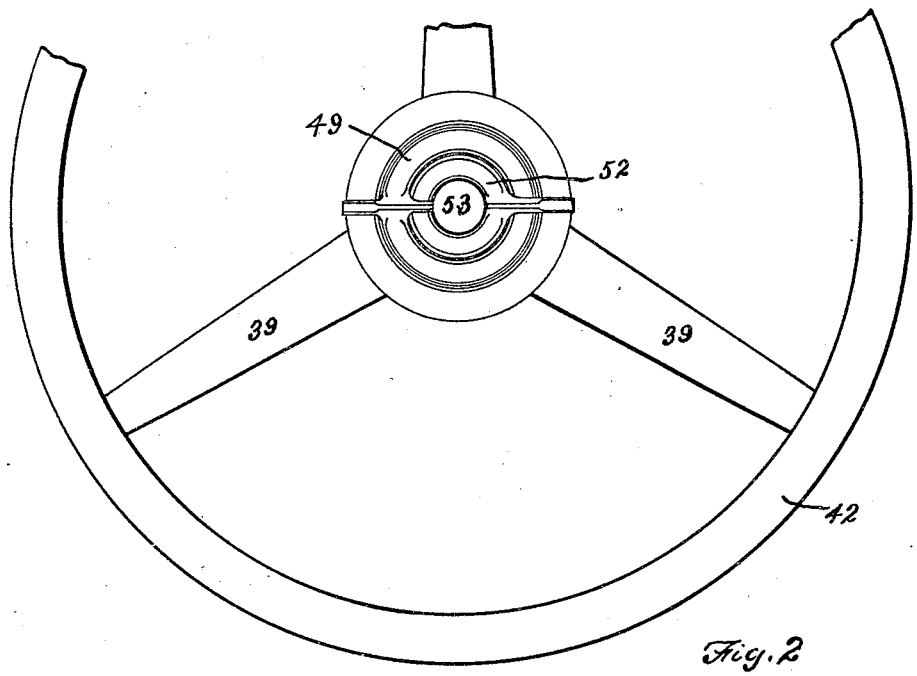
Figure 1:
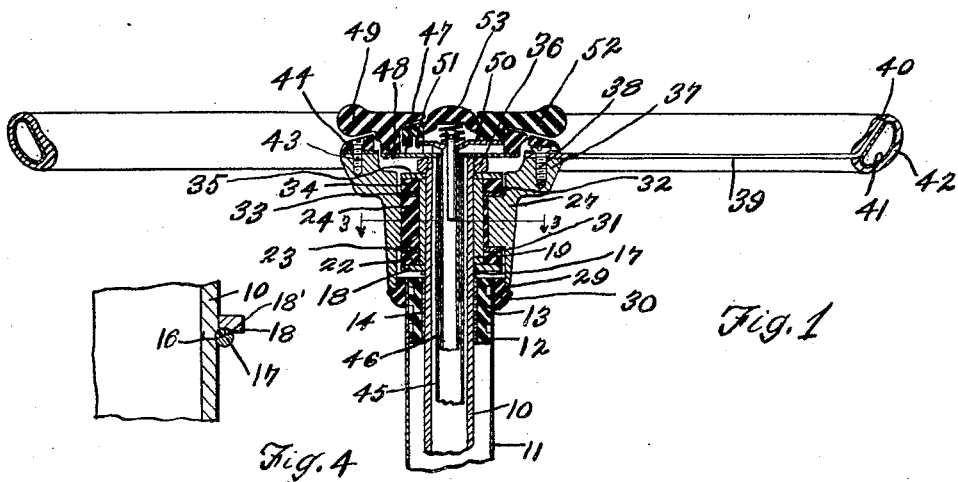
Figure 3:
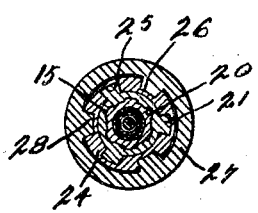

In said annexed drawings:

Fig. 1 is a section through a steering wheel and a portion of the steering column; Fig. 2 is a plan view thereof; Fig. 3 is a transverse section taken substantially along the line 3—3 of Fig. 1 and looking in the direction of the arrows; and Fig. 4 is an enlarged fragmentary sectional view similar to Fig. 1.

Referring more particularly to the drawings, it will be noted that the reference numeral 10 indicates a tubular steering column housed within a tubular post 11 and spaced from said post by a rubber spacer 12 provided with annular grooves 13 to increase its resiliency, a metallic bushing 14 being located between the spacer 12 and the column 10.

Said column is provided with a plurality of longitudinal external ribs 15, and adjacent the bases of said ribs said column is formed with an annular groove 16 for the reception of a spring ring 17. Ordinarily, steering wheels are directly mounted on the column through a metal to metal tapered press fit. The disadvantages of this arrangement will be obvious, since, unless the machining is absolutely accurate, the set-up of the wheels on a series of columns will not be uniform, and since removal of the wheel from the column is an exceedingly difficult matter. According to the present invention, the groove 16 and the spring ring 17 form a uniform fixed assembly point upon which the remaining parts of the assembly may be set up.

To set-up an assembly according to the present invention, the spacer 12 is located in the housing 11 and the column 10 is inserted therethrough and connected at its base to the steering mechanism. The spring ring 17 is then placed in position in the groove 16 and a washer 18 provided with a groove 18' is slipped onto the column and pressed down into engagement with the ring 17, the groove 18' receiving said ring. Thereafter, a metallic bushing 19 provided with a plurality of longitudinally extending grooves 20 for cooperation with the ribs 15 on the column 10 is sleeved over said column and pressed down into engagement with the upper surface of the washer 18. Said bushing is exteriorly formed with a plurality of longitudinally extending ribs 21, as is most clearly shown in Fig. 3.

A rubber washer 22 formed interiorly with grooves adapted to cooperate with said ribs 21 is then sleeved on said bushing and pressed down into engagement with the upper surface of the washer 18. A metallic spacer 23 is sleeved on said bushing 19 and has its lower surface in engagement with the rubber washer 22 and receives against its upper surface the lower end of a rubber sleeve 24. Said sleeve 24 is interiorly formed with grooves 25 to cooperate with the ribs 21 and is exteriorly formed with grooves 26 parallel to but spaced from said grooves 25. Thereafter, a metallic wheel hub 27 formed interiorly with ribs 28 for cooperation with the grooves 26 is sleeved over said rubber sleeve 24 and is pressed down until the lower end of an apron 29 engages a shoulder formed on a rubber collar 30 secured on said post 11. The parts are so proportioned that the lower ends 31 of said ribs 28 simultaneously come into contact with the upper surface of the spacer 23.

A second metallic spacer 33 is then sleeved on the bushing 19 and is pressed down into engagement with the upper end of the sleeve 24 and the upper ends of the teeth 28. A second rubber washer 34 is mounted on said bushing to bear on said spacer 33 and a second metallic washer 35 is mounted on said column to bear on the upper end of the bushing 19 and on the upper surface of the rubber washer 34. The parts are all then secured in position by means of a nut 36 threaded on the upper end of the column 10.

The hub 27 is formed with an upwardly extending flange 37 to which screws 38 secure spokes 39. Said spokes are preferably formed of thin sheet steel of the best quality and having a high index of resiliency, and the free ends of said spokes are bent upwardly as indicated at 40. As shown, the steering wheel proper is built up of a metallic tube 41 and composition 42 molded thereon. If such a wheel is to be used, the bent ends 40 of the spokes 39 may be laid in contact with the inner surface of said tube 41 before the composition 42 is built up thereon, thus embedding the said ends of the spokes in the composition. In case a wooden wheel is used, the ends 40 of the spokes may be secured in slots in the wheel by means of bolts, screws, rivets, or any other well known securing means. Other screws 43 secure to the flange 37 an escutcheon 44 hiding the screws 38.

Nested tubes 45 and 46 are mounted within the steering column 10 and are connected at their lower ends to elements to be controlled such as the light switch, the throttle, the timer or any other element on the vehicle. A disc 47 is secured to the upper end of the tube 45, and one or more hollow rivets 48 secure to said disc an annular control member 49 having a suitable finger piece. Similarly, the tube 46 carries at its upper end a disc 50 to which is secured by means of one or more hollow rivets or studs 51, a control member 52. The usual horn button is shown at 53.

It will be seen that the above described construction provides a steering wheel assembly in which the wheel hub 27 has absolutely no metal to metal steering stress transmitting contact with the steering column 10. Any axial shocks to the steering column will be largely absorbed by the rubber washers 22 and 34 without being transmitted to the hub, and any possible shocks which escape absorption in said washers are absorbed by the resiliency of the spokes 39. The hub 27 is connected for rotation to the steering column through the metal teeth 28 to the metal teeth 21 through the medium of the soft rubber sleeve 24. Thus slight rotational shocks delivered to the steering column are absorbed by the sleeve 24. Thus it will be seen that the washers 22 and 34, the sleeve 24, and the resilient spokes 39 co-operate with each other to eliminate the transmission of road shocks from the road wheels to the steering wheel.

In case of a collision the resiliency of the spokes 39 will prevent to a large extent the injuries to the driver which are so often the result of the driver being violently thrown against the wheel.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a device of the class described, a steering column formed with a groove adjacent its upper end, a spring ring mounted in said groove, a washer mounted on said column, said washer being formed with a groove co-operating with said ring, a bushing mounted on said column and bearing on said washer, a wheel having a hub mounted on said column surrounding said bushing and connected thereto, and means securing said washer and bushing against axial movement away from said ring.

2. In a device of the class described, a steering column formed with a groove adjacent its upper end, a spring ring mounted in said groove, a metal washer mounted on said column, said washer being formed with a groove cooperating with said ring, a metal bushing splined to said column and bearing on said metal washer, said bushing being externally formed with a plurality of longitudinal ribs, a rubber washer sleeved on the inner end of said bushing and bearing on said metal washer, an annular metal spacer sleeved on said bushing and bearing on the outer face of said rubber washer, a rubber sleeve mounted on said bushing, said sleeve being formed internally with a plurality of longitudinal grooves corresponding with said bushing ribs, and said sleeve bearing at its inner end on said spacer, a plurality of longitudinal ribs externally formed on said sleeve and defining grooves, a steering wheel having a metal hub mounted on said sleeve, a plurality of longitudinal teeth internally formed in said hub and corresponding with said sleeve grooves, the inner ends of said teeth bearing on said spacer, a second metal spacer sleeved on said bushing and bearing on the outer end of said sleeve and on the outer ends of said hub teeth, a second rubber washer sleeved on said bushing and bearing on the outer face of said second spacer, a second metal washer sleeved on said column and bearing on the outer end of said bushing and on the outer face of said second rubber washer, and a nut threaded on said column end and bearing on said second metal washer.

3. In combination with a steering column, a steering wheel mounted on said column, and means connecting said wheel to said column and including a rubber element for preventing the transmission of rotational shocks from said column to said wheel, and a pair of rubber members for preventing the transmission of axial shocks from said column to said wheel.

Signed by me this 10th day of August, 1928.

CHARLES R. FLANIGAN.